United States Patent [19]
Rogers

[11] 3,860,032
[45] Jan. 14, 1975

[54] BALL VALVE WITH FLOW CONTROL

[75] Inventor: Gerald L. Rogers, Webster Groves, Mo.

[73] Assignee: Chemetron Corporation, Chicago, Ill.

[22] Filed: Oct. 27, 1972

[21] Appl. No.: 301,664

[52] U.S. Cl............. 137/614.17, 251/175, 251/315
[51] Int. Cl............................................ F16k 43/00
[58] Field of Search....... 137/614.17, 614.18, 454.5, 137/454.6; 251/315, 175

[56] References Cited
UNITED STATES PATENTS

| | | | |
|---|---|---|---|
| 2,754,846 | 7/1956 | Ray | 137/614.17 |
| 2,809,662 | 10/1957 | Ray | 137/614.17 |
| 3,111,299 | 11/1963 | Miller et al. | 251/175 |
| 3,193,248 | 7/1965 | Lowrey | 251/315 |
| 3,331,581 | 7/1967 | O'Connor | 251/315 |
| 3,405,910 | 10/1968 | Scaramucci | 251/367 X |
| 3,707,161 | 12/1972 | Crawford | 137/614.17 X |
| 3,752,181 | 8/1973 | Morris et al. | 251/175 X |

Primary Examiner—Charles J. Myhre
Assistant Examiner—Ira S. Lazarus

[57] ABSTRACT

This ball valve includes a body having a rotatable ball mounted between inlet and outlet ports said ball being provided with a conduit, alignable with said ports when the valve is in the open position. A rotatable flow control element is mounted within the conduit to regulate flow through the conduit when the valve is in the open position. A first actuating key is mounted in the body for engagement with the ball to provide rotation of said ball between the fully opened and fully closed positions and a second actuating key is mounted in the body for engagement with the flow control element to provide independent rotation of said flow control element. The second actuating key regulates the angular setting of the flow control element and the ball can be rotated between an opened and closed position without effecting this setting, so that the valve can be actuated virtually instantaneously from a fully closed position to a particular regulatory setting. The engagement between the actuating keys and associated valve elements provides sufficient clearance to permit the ball to "float" downstream, when it is in the closed position under upstream fluid pressure, to enhance the sealing of the valve.

1 Claim, 12 Drawing Figures

BALL VALVE WITH FLOW CONTROL

BACKGROUND OF THE INVENTION

This invention relates in general to a ball valve and in particular to a cutoff valve having an independent flow control.

Ball valves provide a particularly efficient means of completely cutting off flow in hydraulic lines and are used frequently for this purpose because the cutoff action is virtually instantaneous. Most ball valves include a central conduit, which is axially alignable with the hydraulic line in the open position, and transverse to the hydraulic line in the cutoff position. In each of the limiting positions the ball valve is symmetrically disposed relative to the hydraulic line and there is no uneven pressure distribution on the seals.

Ball valves have also been used as flow control devices by disposing the central conduit in an intermediate position between the open and closed positions. The handle, which is used to actuate the ball serves to indicate the angular disposition of the conduit and charts are used to determine flow rates corresponding to different angular positions. Unfortunately, there are considerable disadvantages in using a ball, having a central conduit, for this purpose. For example, the rim of the conduit distributes pressure unevenly on the ball seat producing a so-called "wire-drawing effect" on the seal when the ball is in an intermediate position. Further, the impact of fluids against the seat causes differential wear because different angles of flow produce impact on different areas of the seat. These conditions are particularly harmful to ball seats of Teflon, an otherwise excellent sealing medium.

In using a ball valve it is an advantage to make provision for slight movement of the ball element downstream when the ball is in the fully closed position so that the upstream pressure assists in making an effective seal between the ball and the ball seat. In the past it has been difficult to reconcile this downstream "floating" with the precision requirements desirable when the ball itself is used as a flow control means.

Valves have been used in the past which include a rotatable ball as the direct action cutoff member and use another element for controlling flow. However, known valves employing a gate element, for example, as the flow control means are deficient either in the efficiency of the valve seal, which results from the interdependent mounting of the valve actuating mechanisms and the consequent inability of the ball to "float" downstream; or from the complexity of the structural parts, which renders such valves difficult to assemble.

The present ball valve, incorporating an independent flow control element, overcomes these objections inherent in known prior valves.

SUMMARY OF THE INVENTION

This ball valve provides a highly efficient and total cutting off of fluid flow through the hydraulic lines with optimum sealing capability. In addition, the valve provides a flow control feature, which is substantially independent of the cutoff control.

The structural arrangement of the valve parts facilitates assembly and the actuating means for the ball and the flow control element respectively are so disposed as to permit axial movement of the ball in the direction of flow. The ball can therefore "float" downstream under upstream pressure in the fully closed position and this capability assures superior sealing between the ball and the ball seat.

The flow control element, which can be a disc, is journal mounted for rotation to selected angular positions within the conduit of the ball to selectively restrict flow.

The actuating means for the ball includes a transverse key mounted in the body of the valve and engageable with the ball for rotation thereof. The actuating means for the disc includes a transverse key oppositely mounted in the body of the valve and operatively engageable with the disc to rotate said disc independently of the ball.

Sufficient clearance is provided between the ball and its associated actuating key and between the flow control disc and its associated key to permit movement of the ball in a downstream direction when the ball is in the closed position whereby to provide superior sealing properties between said ball seat.

The flow control disc may be oriented to any angle to restrict flow through the ball conduit as desired and does not require peripheral sealing with the conduit. Importantly, the ball may be rotated between an open and closed position without effecting the setting of the disc.

The ball valve is relatively simple and inexpensive to manufacture and the valve parts can be readily assembled and disassembled without impairing the valve efficiency.

It is an object of the invention to provide a valve having a body including inlet and outlet ports defining a flow axis, and a valve chamber, disposed intermediate said ports and housing a rotatable ball. The ball includes a conduit, which is alignable with the flow axis when the valve is in a fully open position, and transverse to said flow axis when the valve is in a fully closed position.

It is a further object to provide a flow control element disposed in movable relation within the conduit to regulate flow through the conduit when the ball is in the open position.

It is an advantage to provide a first actuating means rotating the ball between the fully open and fully closed positions and a second, independent actuating means rotating the flow control element.

It is another advantage to provide first and second actuating means, which engage the valve parts in rotatable relation, yet permit the ball to "float" downstream against the ball valve seat in the fully closed position.

Yet another advantage is to provide a flow control element including a disc journal mounted within the ball conduit, which can be rotated to a selected flow control position, and which can be maintained in that position independently of rotation of the ball. The valve can therefore be opened to a selected flow control condition without the necessity of further adjustment, by simply rotating the ball into alignment with the flow axis.

It is an object to provide the ball with an arcuate groove and to provide a first actuating means, which includes an actuating key rotatively mounted within the body and having an arcuate plug engageable with said groove.

A further object is to provide the disc with a shaft, which extends outwardly of the ball, and to provide a second actuating means, which includes an actuating key having a slot receiving the disc shaft in engageable relation.

It is a particular object of the invention to provide sufficient clearance between the actuating keys and the engaged valve elements to permit axial movement of the ball against the ball seat when the valve is in the fully closed position, regardless of the position of the disc.

It is an advantage to provide a disc shaft which is journal mounted within the ball prior to installation of the ball and which is diammetrically movable within said journal mounting following installation of the ball whereby to facilitate installation of the disc.

DESCRIPTION OF THE PREFERRED EMBODIMENT

Figure 1:
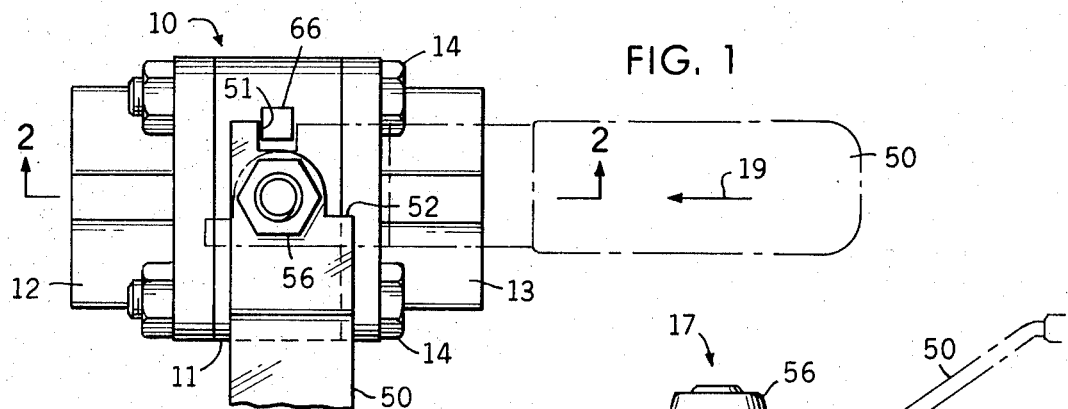
FIG. 1 is a plan view of the valve with the ball in the cutoff position.
Figure 2:
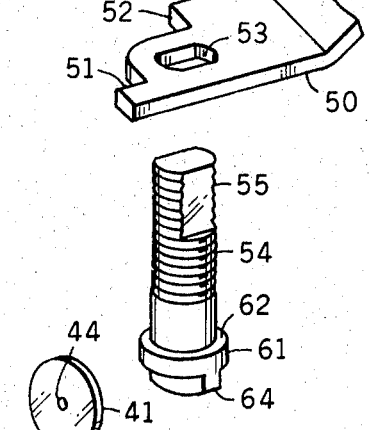
FIG. 2 is a cross sectional view taken on line 2—2 of FIG. 1.
Figure 2:
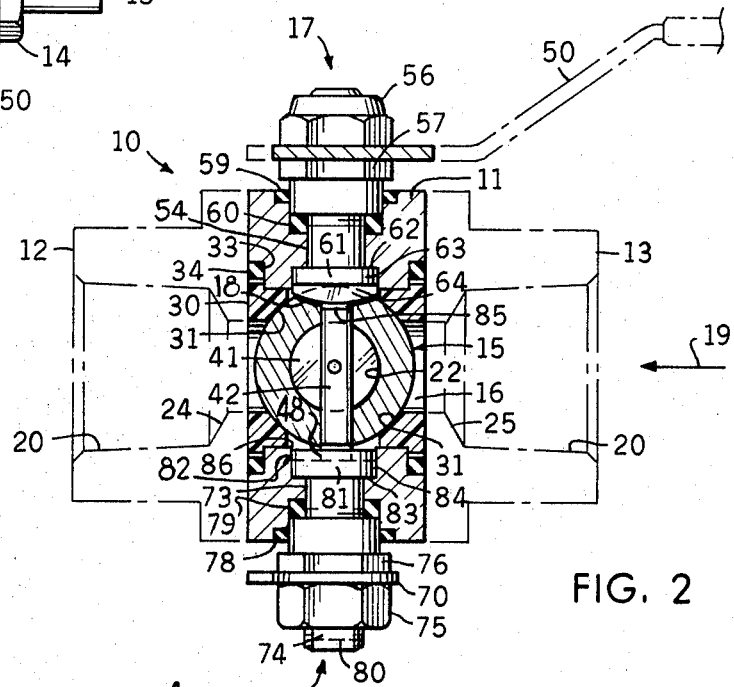

Referring now by characters of reference to the drawings and first to FIGS. 1 and 2 it will be understood that the ball valve includes a housing 10, constituting a body, and having an intermediate portion 11 and flanking end portions 12 and 13 attached thereto by fasteners 14. A ball 15, constituting a first valve means, is rotatably mounted within the interior chamber 16 of the housing 10. The ball 15 is rotatable by means of an actuating key, generally indicated by numeral 17, and constituting a first actuating means. The ball element 15 includes an arcuate groove 18 at the upper end which is engageable by the actuating key 17 to effectuate rotation. The end portions 12 and 13 include bored holes 20 and 21 respectively, constituting inlet and outlet ports communicating with the interior chamber 16 and defining a flow axis 19.

The ball 15 includes a central aperture 22, constituting a conduit, and the inlet and outlet ports 20 and 21 include reduced portions 24 and 25 substantially in axial alignment with said central aperture 22 and having substantially the same diameter. A pair of washers 30 of Teflon, or other suitable material, provides a sealing means between the rotatable ball 15 and the housing 10. It will be observed from FIG. 2 that the inner margins 31 of washers 30 have an arcuate configuration conforming to the diameter of the ball 15, to facilitate sealing between said ball and the housing 10 and providing a seating for the ball, which insures a minimum of frictional resistance to rotation.

The housing intermediate portion 11 includes opposed annular grooves 33, which accommodate O-rings 34 of Teflon or similar material. It will be understood that these O-rings provide a seal between the housing intermediate and end portions, the grooves 33 having a depth slightly less than the diameter of the O-ring cross section to effectuate the sealing. Thus, when the rotatable ball 15 is oriented to its cutoff position, as indicated in FIG. 2, and the inlet aperture is thereby presented with the sealed, imperforate face of the ball 15, flow through the valve in the direction of the flow axis 19 is precluded.

Figure 5:
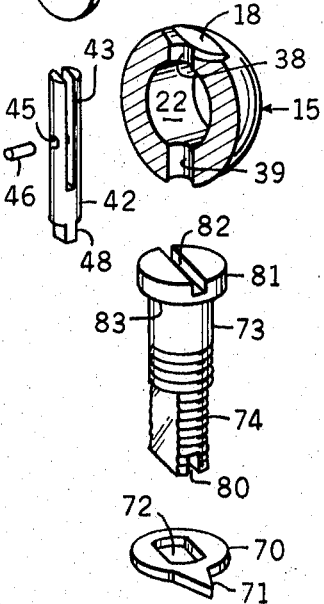
FIG. 5 is an exploded view of the ball and flow control element actuating mechanisms.
Figure 7:
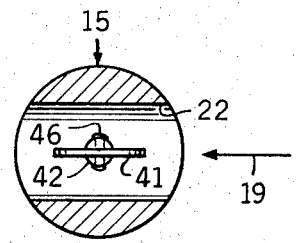
FIG. 7 is a fragmentary sectional view illustrating the relationship between the ball and the flow control disc with the valve position as shown in FIG. 6.
Figure 9:
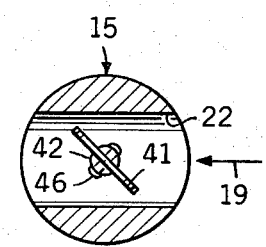
Figure 12:
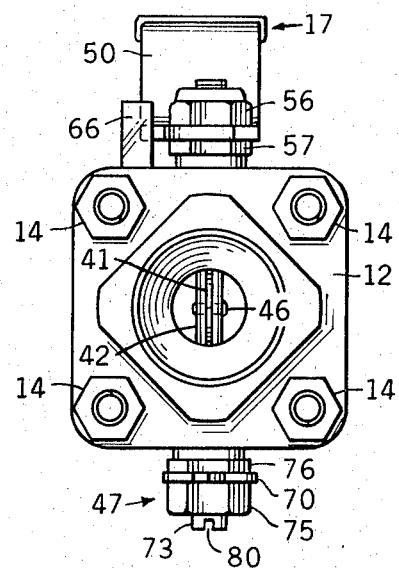
FIG. 12 is an end view of the valve in the position shown in FIG. 6.
Figure 10:
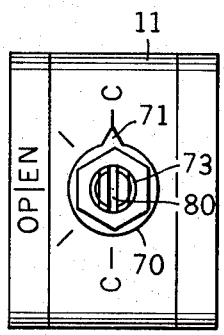
FIGS. 10 and 11 are corresponding views to FIGS. 6 and 7 with the ball in the fully open position and the flow control element in a closed position.
Figure 11:
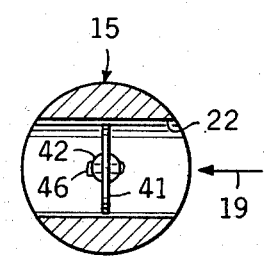

A flow control assembly, generally indicated by numeral 40 and constituting a second valve means is mounted within the conduit 22 of the ball 15. The assembly 40 includes a disc 41, which is carried by a bifurcated shaft 42, said shaft defining a groove 43 receiving said disc 41. The shaft 42 is journal mounted within upper and lower journal apertures 38 and 39 provided in the ball 15. As shown in FIG. 5 the disc 41 and shaft 42 are each apertured, at 44 and 45 respectively, to receive a holding pin 46. The disc 41, which is slightly smaller in diameter than the conduit 22, does not require sealing and may be easily rotated within said conduit by means of an actuating key 47, which constitutes a second actuating means. The shaft 42 includes a reduced portion 48 at the lower end, which is engageable by the actuating key 47 for rotation thereby. It will be understood that when the ball 15 is in the open position the disc 41 restricts the flow through the conduit 22 in proportion to its angular disposition. When aligned with the conduit flow axis 19, as shown in FIG. 7, flow is virtually unimpeded. An intermediate position of the disc, in which flow is partially impeded, is shown in FIG. 9 and FIG. 11 shows the disc perpendicularly oriented relative to the flow axis 19, which results in maximum impedance to flow. In order to provide complete cutoff of the valve, the ball 15 is rotated into a closed position as shown in FIGS. 1 and 2.

It is particularly desirable that the valve be completely closed in the cutoff position, when the conduit 22 is perpendicular to the flow axis 19. To effectuate this it is highly important that the ball 15 be sealingly engaged with the downstream seat provided by the margins 31 of the washer 30. In order to provide a seal of maximum efficiency the structural arrangement of parts, between the actuating keys 17 and 47 and the associated valve elements, is such as to permit the ball to "float" downstream under pressure from the upstream fluid, when the ball is in the closed position. In the preferred embodiment the engagement between the actuating keys 17 and 47 and associated valve elements provides sufficient clearance to permit axial movement of the ball 15 regardless of the angular disposition of the disc 41. It is also desirable for the disc 41 to be oriented to a particular flow restriction position and to be maintained in that position regardless of whether the ball is in the open or closed position so that a particular flow rate can be achieved instantly by simply rotating the ball from the closed to the open position. In the preferred embodiment the actuating keys 17 and 47 are independently mounted within the housing 10, which permits relative rotational movement of the ball 15 and the disc 41. The actuating keys 17 and 47 will now be described with particularity.

Figure 3:
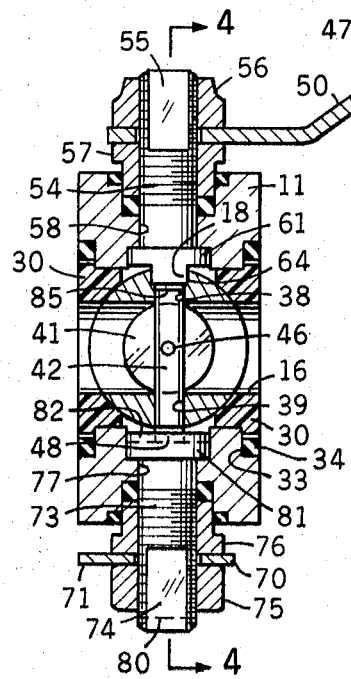
FIG. 3 is a fragmentary view of the valve with the ball and flow control disc in fully open positions.

The actuating key 17 includes a cranked handle 50 having opposed shoulders 51 and 52 and an elongate aperture 53, which receives the compatibly shaped end 55 of a rotatable stem 54. The stem end 55 is threaded to receive nuts 56 and 57, whereby the handle 50 and the transverse stem are secured together to form an integral key unit. It will be observed from FIG. 3 that the housing 10 includes a central aperture 58 receiving the key stem 54 in rotatable relation and that said aperture 58 is stepped to accommodate a pair of O-rings 59 and 60 of rubber or other suitable sealing material. At its remote end the stem 54 includes a head 61 providing an annular shoulder 62 and the aperture 58 includes a corresponding socketed portion 63 receiving said annular shoulder and precluding outward movement of said stem 54. Importantly, the head 61 includes a downwardly projecting, arcuately-configured plug 64, providing opposed shoulder portions, constituting shoulder means, and the plug 64 engages the compatibly configured arcuate groove 18 provided in the rotatable ball 15, said groove providing opposed abutment portions, constituting an abutment means engageable by said shoulder portions. As shown in FIG. 1 the housing 10 includes a stop element 66, which is engageable by the handle shoulders 51 and 52 to limit rotation of the actuating key 17 and thereby define the valve cutoff and valve open positions.

The actuating key 47 includes an indicator plate 70 having an indicator point 71 and an elongate aperture 72, which receives the compatibly shaped end 74 of a rotatable stem 73. The stem end 74 is threaded to receive nuts 75 and 76 whereby the indicator plate 70 and the transverse stem 73 are secured together to form an integral key unit. The housing 10 includes a central aperture 77 rotatably mounting the key stem 73 and said aperture 77 is stepped to accommodate a pair of O-rings 78 and 79 of suitable sealing material. The stem 73 includes a slot 80 at its proximate end, into which a screwdriver may be inserted to rotate said stem. The remote end of the stem 73 includes a head 81, which is provided with a slot 82 providing opposed shoulder portions constituting an abutment means. The underside of the head 81 provides an annular shoulder 83 and the aperture 77 includes a corresponding socketed portion 84 receiving said annular shoulder and precluding outward movement of said stem 73. The sides of the slot 82 are engageable by the compatibly configured reduced shaft end 48 providing opposed shoulder portions constituting a shoulder means, at the lower end of the flow control assembly shaft 42, whereby the disc 41 is rotated when the key 47 is rotated.

Figure 6:
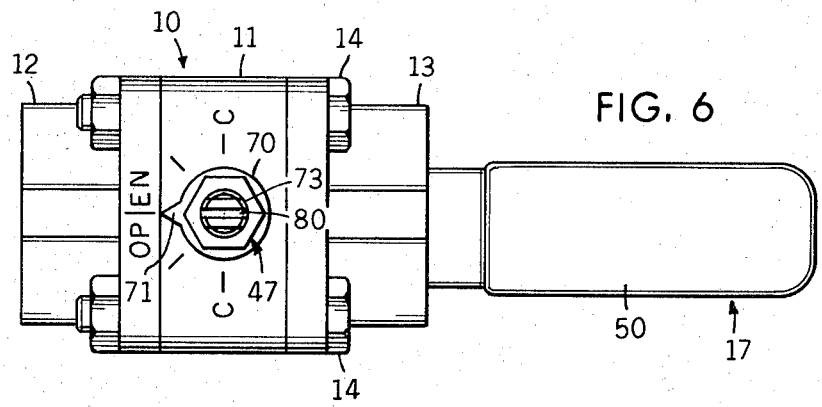
FIG. 6 is a view of the underside of the valve illustrating the disposition of the flow control indicator when the ball and the flow control disc are in the fully open position.
Figure 8:
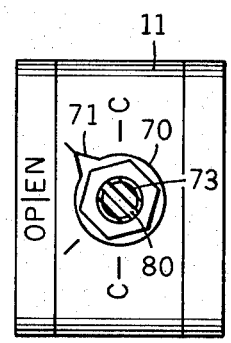
FIGS. 8 and 9 are corresponding views to FIGS. 6 and 7 with the ball in the fully open position and the flow control disc in an intermediate position.

As shown in FIGS. 6, 7 and 8 the underside of the body 10 is provided with indicia corresponding to the degree of angular rotation of the disc 41. FIGS. 7, 9 and 11 respectively show the restrictive disposition of said disc corresponding to open, intermediate and closed positions. It will be understood that, because of the independent mounting of the actuating keys 17 and 47, the rotation of the handle 50 does not rotate the disc 41 but that disc rotation is effectuated by rotating stem 73, as by applying a screw driver to groove 80.

Figure 4:
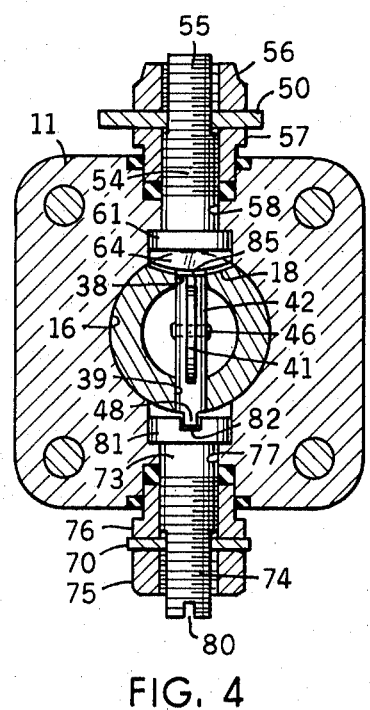
FIG. 4 is a fragmentary view taken on line 4—4 of FIG. 3.

It will be observed from FIG. 4 that the shaft end 48 is received within the corresponding slot 82 in the head of the stem 73 with a degree of clearance which permits movement of the shaft end 48 transversely of the slot 82 as well as longitudinally. Because of this the lower portion of the ball 15 has a movement capability in the direction of the flow axis 19 regardless of the angular disposition of the disc 41. In addition, the arcuate nature of the engagement between the plug 64 of the key 17 and the ball groove 18 permits movement of the upper portion of the ball 15 in a general downstream direction when the ball element is in the closed position, which is shown in FIG. 4. This downstream movement is facilitated by vertical clearance between the shaft 42 and the head of the key 47. Thus, when the ball 15 is in the closed position it will "float" downstream in response to upstream fluid pressure exerted upon the upstream face of said ball with the result that said ball is urged into sealing engagement with the downstream sealing washer 30.

It is thought that the structural features and the functional advantages of this ball valve, with separate flow control, have become fully apparent from the foregoing description of parts, but for completeness of disclosure the installation and operation of the device will be briefly described.

The assembly of the valve as a whole is commenced by installing the disc shaft 42 within the journal apertures 38 and 39 of the ball 15. In the preferred embodiment the disc 41 itself is mounted later as will be described. The key stems 54 and 73 are mounted into their respective apertures 58 and 77 from the interior of the housing chamber 16 and are oriented as indicated in FIG. 2 to facilitate the installation of the ball 15, because of the tongue and groove arrangement between the actuating key 17 and the arcuate groove 18, and between the shaft end 48 and the slot 82. Prior to the installation of the ball 15 the shaft 42 is inserted upwardly within said ball a somewhat greater amount than shown in FIG. 2 so that the gap 85 between the shaft 42 and the plug 64 is substantially taken up. Because of this the shaft extension below the ball 15 is less than shown in FIG. 2 to permit the lower shaft end to clear the margin 86 of the socket 84 when the ball 15 is guided into place, by the arcuate plug 64. Once mounted, the shaft 42 can be pushed slightly downward and acts to retain the ball 15 in place within the chamber 16. The disc 41 can then easily be installed within the bifurcated shaft 42 and secured in place by the pin 46. If desired a slightly shorter disc shaft 42 can be provided so that the disc 41 can be mounted within the ball 15 prior to installation of said ball. The sealing washers 30, which are a push fit within the chamber 16 are disposed on either side of the ball 15 following installation of said ball and the housing end portions 12 and 13 are secured to the intermediate portion 11 by fasteners 14. Thus, sealingly mounted within the interior chamber 16 the ball 15 is conditioned for rotation.

When the handle 50 is rotated into alignment with the flow axis 19 the central aperture 22 of the ball 15 is in alignment with the inlet and outlet ports 20 and 21 and the valve is in an open position. By turning the handle 50 through 90° the ball 15 is rotated so that the conduit 22 is disposed transversely to the flow axis 19 and the upstream ball face blocks flow between the inlet and outlet ports 20 and 21 to define the valve closed position. When the ball 15 is in the open position the disc 41 can be rotated to regulate flow as desired. Importantly, the disc 41 maintains its alignment, once set, regardless of whether the ball 15 is in the open or closed position. This feature which results from independent mounting of the keys 17 and 47 permits accurate flow regulation to be achieved the instant that the ball valve is open. Further, the clearance between the keys 17 and 47 and their corresponding valve elements permits the ball 15 to "float" downstream under pressure of upstream fluid, when the valve is in the closed position, resulting in superior sealing of the valve.

I claim as my invention:

1. A ball valve comprising:
   a. a body including a valve chamber and inlet and outlet ports communicating with said chamber,
   b. a ball means disposed within the valve chamber and rotatable between an open and a closed position said ball means including a conduit communicating between the inlet and outlet ports in the open position,
   c. sealing means between the ball means and the body,
   d. first actuating means rotating the ball means between the open and closed position and including;
      1. a first key mounted within the body transversely of the conduit and having a connection with the ball means for rotating said ball means between the open and closed positions,
   e. a flow control means including shaft means journalled in and carried by the ball means for rotatively mounting said flow control means within said conduit, and
   f. second actuating means rotatively mounted in an aperture of the wall of the body transversely of the conduit and having a connection with the shaft means for selectively rotating said flow control means within the conduit to restrict flow through the conduit when the ball means is in the open position, the said connections having clearance for enabling movement of the ball means relative to the body and against the sealing means when the ball means is in the closed position with the flow control means rotated to and maintained in any selected position within the conduit.

* * * * *